United States Patent
Weinstein et al.

(10) Patent No.: US 8,314,839 B2
(45) Date of Patent: Nov. 20, 2012

(54) CONCEALMENTS FOR COMPONENTS OF A COVERT VIDEO SURVEILLANCE SYSTEM

(75) Inventors: Richard D. Weinstein, St. Louis, MO (US); Ric Sauer, St. Louis, MO (US)

(73) Assignee: Sentrus, Inc., Chesterfield, MO (US)

( * ) Notice: Subject to any disclaimer, the term of this patent is extended or adjusted under 35 U.S.C. 154(b) by 456 days.

(21) Appl. No.: 12/475,167

(22) Filed: May 29, 2009

(65) Prior Publication Data
US 2010/0302372 A1 Dec. 2, 2010

(51) Int. Cl.
*H04N 9/47* (2006.01)

(52) U.S. Cl. ......... 348/151; 348/143; 348/154; 348/155

(58) Field of Classification Search ............ 348/61, 348/372, 143–155; 707/3
See application file for complete search history.

(56) References Cited

U.S. PATENT DOCUMENTS

| | | | | |
|---|---|---|---|---|
| 4,963,962 A * | 10/1990 | Kruegle et al. | | 348/151 |
| 6,064,430 A * | 5/2000 | Lefkowitz | | 348/151 |
| 6,151,065 A * | 11/2000 | Steed et al. | | 348/148 |
| 6,198,502 B1 * | 3/2001 | Watkins | | 348/148 |
| 6,201,568 B1 * | 3/2001 | Watkins | | 348/148 |
| 6,249,310 B1 * | 6/2001 | Lefkowitz | | 348/151 |
| 6,735,781 B1 * | 5/2004 | Fulmer | | 2/94 |
| 6,812,970 B1 * | 11/2004 | McBride | | 348/372 |
| 7,051,356 B2 | 5/2006 | Weinstein | | |
| 7,382,244 B1 | 6/2008 | Donovan et al. | | |
| 7,397,368 B2 | 7/2008 | Otto et al. | | |
| 7,456,727 B2 | 11/2008 | Pinter et al. | | |
| 7,460,148 B1 | 12/2008 | Clark et al. | | |
| 7,460,689 B1 | 12/2008 | Chan | | |
| 7,468,662 B2 | 12/2008 | Velipasalar et al. | | |
| 7,479,980 B2 | 1/2009 | Merheim et al. | | |
| 7,480,715 B1 | 1/2009 | Barker et al. | | |
| 7,492,821 B2 | 2/2009 | Berman et al. | | |
| 7,508,418 B2 | 3/2009 | Renkis | | |

(Continued)

FOREIGN PATENT DOCUMENTS

JP 2000101966 4/2000

(Continued)

OTHER PUBLICATIONS

Roessler. "How to Find Hidden Cameras." Mar. 2002. Web.*

(Continued)

*Primary Examiner* — Andy S. Rao
*Assistant Examiner* — Michael Martinez
(74) *Attorney, Agent, or Firm* — Polster, Lieder, Woodruff & Lucchesi, L.C.

(57) ABSTRACT

A concealment (10) for equipment (13) including imaging devices, audio equipment, and sensors. The concealment comprises a frame (12) which, when assembled, forms the outline of a naturally occurring or manmade object. A covering (22) fits over the assembled frame. An outer surface (24) of the covering has a texture and finish that passes for the outer surface of the natural or manmade object the concealment represents. The frame provides a mounting for the equipment installed within the concealment, with the equipment being positioned to provide surveillance of an area (A) within which the concealment is located. The frame and covering are both made from materials which do not interfere with the transmission of signals from the equipment to a monitoring site, nor the reception of signals from the monitoring site to the equipment installed within the concealment to control operation of the equipment.

12 Claims, 2 Drawing Sheets

U.S. PATENT DOCUMENTS

| | | | |
|---|---|---|---|
| 7,508,941 B1 | 3/2009 | O'Toole, Jr. et al. | |
| 7,511,612 B1 | 3/2009 | Monroe | |
| 7,515,042 B2 | 4/2009 | Benco et al. | |
| 7,542,588 B2 | 6/2009 | Ekin et al. | |
| 7,543,327 B1 | 6/2009 | Kaplinsky | |
| 7,546,624 B2 | 6/2009 | Vishloff et al. | |
| 7,548,258 B2 | 6/2009 | Kaplinsky | |
| 7,548,803 B2 | 6/2009 | MacCarthy | |
| 7,551,075 B1 | 6/2009 | Monroe | |
| 7,561,037 B1 | 7/2009 | Monroe | |
| 7,577,199 B1 | 8/2009 | Herz | |
| 7,581,702 B2 | 9/2009 | Olson et al. | |
| 7,603,087 B1 | 10/2009 | Renkis | |
| 7,999,720 B2 * | 8/2011 | Jung et al. | 342/3 |
| 2002/0067411 A1 * | 6/2002 | Thompson et al. | 348/207 |
| 2004/0056949 A1 * | 3/2004 | Lin | 348/61 |
| 2004/0066451 A1 * | 4/2004 | Schroth | 348/144 |
| 2004/0189803 A1 * | 9/2004 | Price | 348/151 |
| 2004/0218083 A1 * | 11/2004 | Thompson et al. | 348/335 |
| 2004/0227815 A1 * | 11/2004 | Chen | 348/151 |
| 2005/0053732 A1 * | 3/2005 | Tilby | 428/17 |
| 2007/0011141 A1 * | 1/2007 | Foucault et al. | 707/3 |
| 2008/0117298 A1 * | 5/2008 | Torres | 348/151 |
| 2009/0179463 A1 * | 7/2009 | Fargason, III | 297/16.2 |

FOREIGN PATENT DOCUMENTS

| | | |
|---|---|---|
| JP | 2000253388 | 9/2000 |
| JP | 2000270330 | 9/2000 |
| JP | 2000333152 | 11/2000 |
| JP | 200350183 | 12/2000 |
| JP | 2001008072 | 1/2001 |
| JP | 2001333389 | 11/2001 |
| WO | 9504431 | 2/1995 |
| WO | 9718542 | 5/1997 |
| WO | 9914882 | 3/1999 |

OTHER PUBLICATIONS

A, A. "Spycam City—Page 2—News—New York—Village Voice." New York News, Events, Restaurants, Music. Oct. 6, 1998. Web. Sep. 20, 2011. <http://www.villagevoice.com/1998-10-06/news/spycam-city/2/>.*

Mann. "Privacy Issues of Wearable Cameras versus Surveillance Cameras." Random Disorganized Thoughts on WearComp.org, WearCam.org, UTWCHI, Funtainand Steve Mann's Personal Web Page/research. Feb. 1995. Web. <http://wearcam.org/camera_taxonomy.html>.*

B. Edge. "GXF—The General Exhange Format". EBU Technical Review. (2002). Special Issue. pp. 1-9.

G. Yang, C. Sun, C. Wrigley, D. Stack, C. Kramer and B. Pain. "Dynamically Reconfigurable Imager for Real-Time Staring Vision Systems". Battlespace Digitalization and Network-Centric Warfare Conference. (2001). Orlando, Florida. pp. L3-1-L3-4.

L. Klein . "Evaluation of Mobile Surveillance and Wireless Communication Systems: Field Operational Test". California Path Program. Institute of Transportation Studies. (1999). No. 1683. pp. 14-21.

R. G. Baker and J. Mosley. "Enhanced Electronic Camera". IBM Technical Disclosure Bulletin. (1995). vol. 38, No. 3. pp. 53-54.

* cited by examiner

CONCEALMENTS FOR COMPONENTS OF A COVERT VIDEO SURVEILLANCE SYSTEM

CROSS REFERENCE TO RELATED APPLICATIONS

None

STATEMENT REGARDING FEDERALLY SPONSORED RESEARCH OR DEVELOPMENT

None

BACKGROUND OF THE INVENTION

This invention relates to naturally appearing, artificially constructed objects for use in concealing components of a covert video surveillance system.

In U.S. Pat. No. 7,051,356 there is described a covert video surveillance system which has been used by our armed forces in combat areas where these forces are deployed and by other entities in overt environments. The purpose of the system deployed in the patent is to obtain "real time" video imagery of activities being conducted in enemy or contested types of areas, and display the imagery, again in real time, to armed forces personnel and personnel of other entities. This enables area commanders and other users to immediately determine whether the observed activities constitute a threat to our armed forces as well as other entities, our allies, and civilian non-combatants. The commanders and other personnel can then readily implement a response, if any, to the activities observed.

In order for the surveillance system to operate undetected, it is necessary and important that certain system components be effectively hidden so to be undetectable by those being observed. Further, because the video surveillance system is used in hostile environments, it is also important that the components be protected, as much as possible, from the elements. Otherwise, temperature extremes, heat, dust, humidity, etc., will render these components ineffective, detracting from the system's capabilities.

The concealments used with the system must be capable of easy transport, and quick assembly and disassembly. Since communications from the components at a monitored site(s) is by RF transmissions, the concealments must be transparent to RF signals at the frequencies used by the system. Otherwise, transmissions may be so degraded that effective communications between the monitored site and the viewing site will not be possible.

BRIEF SUMMARY OF THE INVENTION

The present invention is directed to concealments used with a covert video surveillance system to position components of the system at a monitored site in a concealed manner that prevents their ready detection. The concealments can simulate and represent both naturally occurring elements such as rocks, tree trunks, etc.; as well as manmade objects such as walls or sections of walls, posts, etc.

The concealment includes a lightweight frame that is readily assembled and disassembled. The frame provides a mounting surface for an imaging device such as a video camera or infrared detector, a microphone for picking up audio sounds including human voices, other types of sensors; as well as power supplies and transceivers used with this equipment.

A covering fits over the frame and the outer surface of the covering is prepared so that, even at close distances, it has a texture and finish that passes for the outer surface of a "real" object it represents. The covering is made of a material that will not rip, tear, or fall apart even in extreme environments such as deserts, mountains, and arctic terrains where high winds, rain, sand, snow, sleet, and other blown objects or debris are often encountered.

All components used to manufacture the concealment, including the frame and outer covering, are made transparent to RF signals so as not degrade transmissions from or to the equipment housed within the concealment. The frame and cover can be manufactured in one piece, or in modules or sections for ease of transport and assembly. Once installed at a location, equipment installed in the concealment is left unattended for prolonged periods of time.

The concealment is readily transportable, either as assembled or disassembled, from one site to another. Special equipment is typically not required to lift, move, transport, and relocate a concealment. The concealment is readily stored in a container so the concealment is readily carried by personnel, motorized transport, by air drop, or sea transport.

Besides concealing equipment used in covert surveillance systems, the concealments can also be used to safely store supplies that may be needed at some point in time, but are not currently required for use; or objects which a person may want to have available but which they do not want on their person at all times.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIGS. 2A-2C are representative concealments in which FIG. 2A represents a section of a wall. FIG. 2B a rock, and FIG. 2C a post;

Corresponding reference characters indicate corresponding parts throughout the several views of the drawings.

DETAILED DESCRIPTION OF INVENTION

Figure 1:
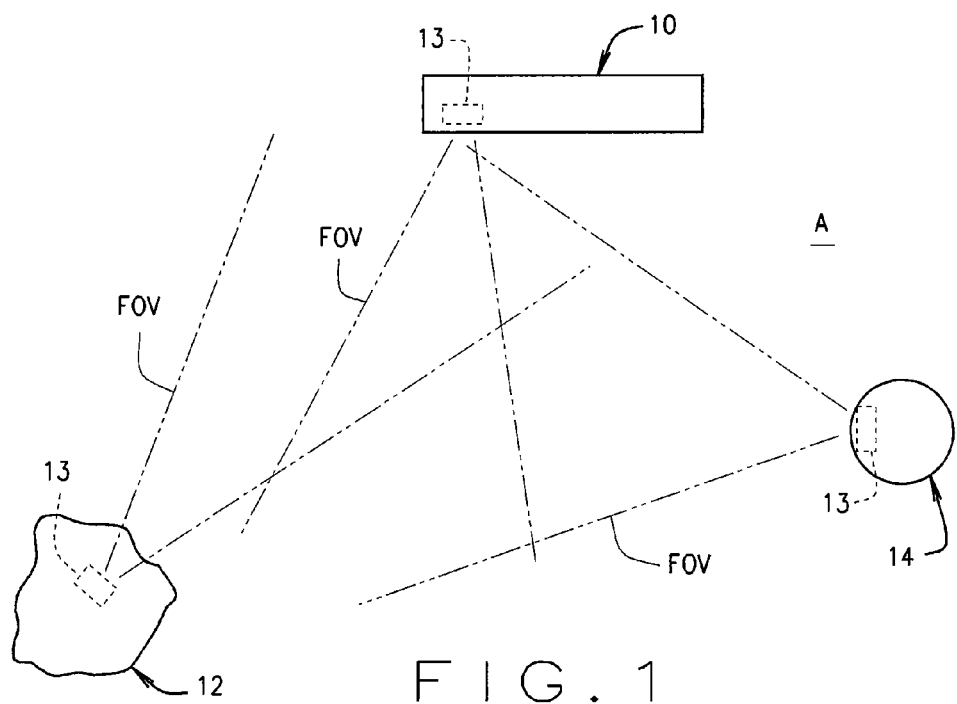
FIG. 1 is a representation of an area under surveillance and in which the concealments are placed to observe activities within the area.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to the drawings, a covert video surveillance system such as described in U.S. Pat. No. 7,051,356 employs equipment, indicated generally 13 in the drawings, to monitor activities within an area A of interest as shown in FIG. 1. The equipment 13 includes, but is not limited to, imaging devices of various types, audio pick-up devices, and sensors. The equipment 13 also includes ancillary equipment such as power supplies for powering the equipment and transceivers for communicating signals from the area of interest to a remote monitoring site and receiving control signals back to the monitoring site for management, controlling and operation of the equipment.

Figures 2A, 2B, 2C:
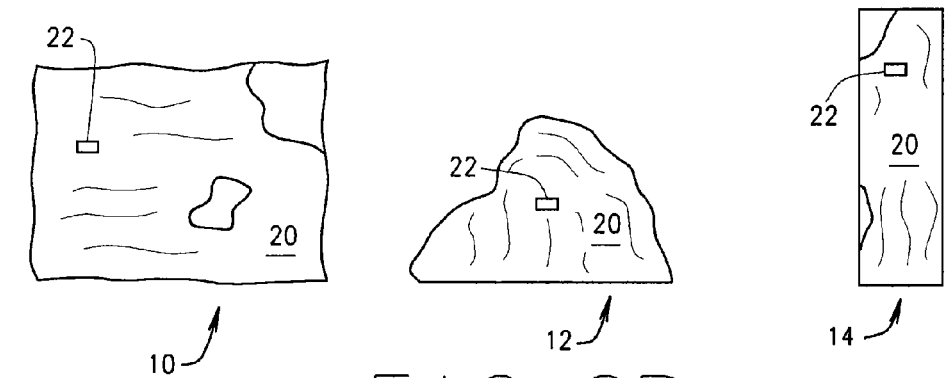

To facilitate the covert surveillance, this equipment is installed and housed in various concealments indicated 10, 12, and 14. The concealments are designed and constructed so to hide the equipment 13 and prevent its detection by those whose activities are being covertly observed. As shown in FIGS. 2A-2C, the concealments are replicas of both natural and manmade objects. Thus, concealment 10 represents a section of a wall, concealment 12 a rock, and concealment 14 a post or tree stump. Those skilled in the art will understand that other objects can also be replicated by a concealment of the present invention.

Figure 3A:
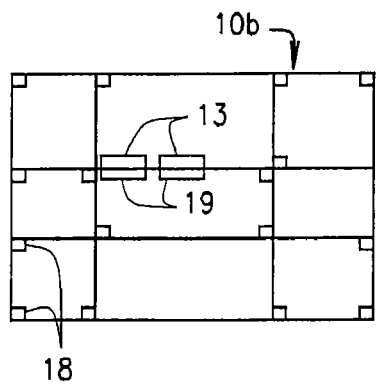
FIGS. 3A-3C illustrates frames for the corresponding objects shown in FIG. 2A-2C; and, FIG. 4 illustrates representative structural elements for assembling a frame.
Figure 3B:
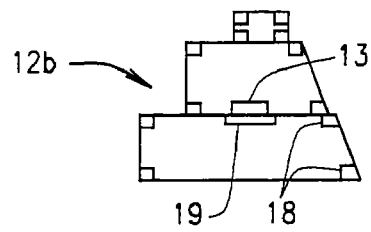
Figure 3C:
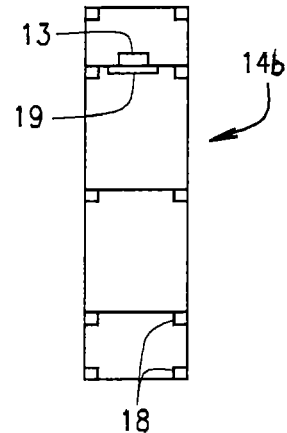
Figure 4:
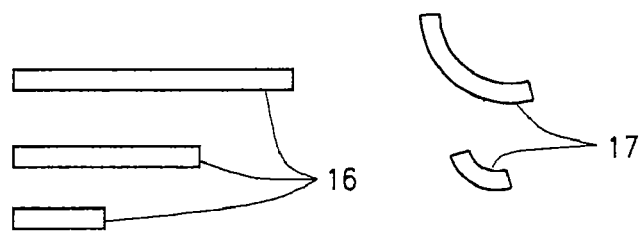

Referring to FIGS. 3A-3C, each concealment first comprises a frame indicated 10b, 12b, and 14b respectively. Each frame, when assembled, forms the outline of the natural or manmade object represented by the concealment. Each frame includes a plurality of frame members. As shown in FIG. 4, the frame members comprise straight sections such wires or rods 16 of different lengths, as well as curved or arcuate sections 17. Brackets or fasteners 18 are used to attach the various frame members together. Each frame further includes mounts 19 attached to the frame members for properly positioning pieces of equipment within the concealment. It will be understood that the pieces of equipment are small, lightweight, and compact, so that they are easily mounted to the frame, and do not overly stress the frame or cause it to fail. Importantly, and as discussed hereinafter, the frame members are made of a lightweight, non-metallic material. If the members are made of a plastic, carbon fiber, or fiberglass material (or other similar materials), these materials cannot have any metal particles incorporated in it.

A covering 20 fits over each frame. The covering is designed and constructed to provide an outer surface whose texture and finish enables the completed concealment to pass for the natural or manmade object 10, 12, 14, the concealment represents. Each covering comprises a fabric or web of material that forms a base. The base is then painted with one or more colors to produce a naturally appearing color and texture. Swatches of materials, rocks, or other objects are applied to the fabric, as appropriate, to provide depth and texture to the cover and enhance its natural looking appearance. To achieve this effect, the fabric is, for example, fitted over the frame of the concealment it will cover, with the material swatches, paint, and objects being then appropriately applied until the cover looks as it needs to appear when the concealment is put in place. Again, the paint and other materials used cannot have metal or metallic constituents in them.

A covering 20 has an aperture 22 formed it. The aperture is small enough that it will not be noticed by someone, even if they are close to the concealment. The aperture is, however, large enough that the lens of a camera installed within the concealment has a sufficiently large field of view (FOV) that it can capture activities occurring at site A. As shown in FIG. 1, if more than one camera is located at the site, the concealments in which they are installed are positioned so their FOVs overlap.

With regard to the components used to manufacture the both the frame and cover of a concealment, those skilled in the art will appreciate that transmitting and receiving RF signals in proximity to metals or metallic objects can affect the quality of the signal to the detriment of the covert surveillance. By using materials which are transparent to RF signals, transmissions from or to the equipment housed within a concealment is not attenuated or otherwise distorted, enabling the covert surveillance system to operate effectively.

The frame and cover can be made in one piece, or in modules or sections for ease of transport and assembly. In many instances, the concealments placed in containers by which they are carried to site A on foot. The containers carrying the concealments can also be delivered by motorized transport, air drop or sea carrier. Since the site is usually in a dangerous area, the concealments are designed for rapid assembly and deployment so as not to unduly expose personnel to the dangers of the area. Most often, once the concealments are erected at the location and the equipment is installed and operational, the equipment is left unattended for prolonged periods of time. In combat, insurgency, or anti-terrorist operations, it is important that the equipment not be discovered by the enemy. Therefore, the concealments must be capable of withstanding prolonged exposure to the elements without toppling or falling over, and without the cover ripping, tearing, or falling apart. It will also be appreciated that the same concealments can be used in different locales; and that for this purpose, each concealment may have more than one covering with a separate covering being available for use at each locale where the structure is deployed.

While the concealments are primarily used to house equipment 13 of the covert surveillance system, it will be appreciated that the concealments can be used for other purposes as well. For example, the concealments can be used to cache replacement parts for the equipment, so if a piece of equipment fails and needs to be replaced, a spare is already located near site A and does not have to be carried to the site. Or, other things can be stored within a concealment so to be available if needed, but otherwise out of site and non-detectable.

In view of the above, it will be seen that the several objects and advantages of the present disclosure have been achieved and other advantageous results have been obtained.

Having thus described the invention, what is claimed and desired to be secured by Letters Patent is:

1. A concealment for equipment used for remote surveillance of a monitored site to hide and conceal the equipment at the site and prevent its detection comprising:

a lightweight, manually portable, frame which, when installed at a selected location at the site, forms the outline of a naturally occurring or manmade object indigenous to the location;

a lightweight, non-metallic, removable and replaceable covering which fits over the frame and whose outer surface has a texture and finish that passes for the outer surface of the natural or manmade object the concealment represents;

the frame providing a mounting for the equipment installed within the concealment, the equipment including one or more of a camera, audio device, a transmitter and receiver for communications between the monitored site and a distant location and means for powering the equipment, the equipment being selectively positionable in a desired orientation within the concealment so to effectively provide surveillance of the site and to provide real time information from the site to a distant location where a threat assessment of activities occurring at a localized area at the site is performed; and, the concealment being relocatable from the one monitored site to a new monitored site including removing and replacing the covering of the concealment for the concealment to be repeatedly adaptable to represent a naturally occurring or manmade object indigenous to a new monitored site.

2. The concealment of claim 1 in which the frame comprises a plurality of frame members connected together, the frame members comprising straight and curved sections.

3. The concealment of claim 2 further including brackets and fasteners for attaching frame members together, and a mount attached to a frame member for properly positioning a piece of equipment within the concealment.

4. The concealment of claim 1 in which the cover comprises a web of material to which swatches of other materials are applied to give the cover texture and depth.

5. The concealment of claim 4 further including at least one paint applied to the cover to give the cover a natural looking appearance.

6. The concealment of claim 4 in which the fabric does not rip, tear, or fall apart even with when the cover has prolonged exposure to the elements.

7. The concealment of claim 1 further including a manually portable container in which the concealment is manually carried to a site where the concealment is erected.

8. The concealment of claim 1 in which the frame further provides a mounting for one or more sensors used to detect activities occurring at the monitored site.

9. The concealment of claim 1 in which the object represented by the concealment is generally cylindrical in form and shape.

10. The concealment of claim 9 in which the object represented by the concealment is generally non-cylindrical in form and shape.

11. The concealment of claim 1 in which the object represented by the concealment is generally rectangular in form and shape.

12. The concealment of claim 1 in which the object represented by the concealment is irregular in form and shape.

* * * * *